Aug. 20, 1968 E. M. OWENS 3,398,240

SIGNAL ROUTING CONTROL SYSTEM

Filed Dec. 21, 1964 2 Sheets-Sheet 1

Eugene M. Owens
INVENTOR.

BY Clarence A. O'Brien
and Harvey B. Jacobson
Attorneys

SIGNAL ROUTING CONTROL SYSTEM

Filed Dec. 21, 1964 2 Sheets-Sheet 2

Eugene M. Owens
INVENTOR.
BY Clarence A. O'Brien and Harvey B. Jacobson
Attorneys United States Patent Office 3,398,240
Patented Aug. 20, 1968

3,398,240

SIGNAL ROUTING CONTROL SYSTEM

Eugene M. Owens, 2609 Parish Ave., Newport News, Va. 23607

Filed Dec. 21, 1964, Ser. No. 419,792
2 Claims. (Cl. 179—1)

ABSTRACT OF THE DISCLOSURE

A system for distribution of a plurality of audio signals to a plurality of remote locations from a plural input source with selectivity and volume controls at both the remote locations and at a central station providing thereby a wide choice of audio signals at the remote locations.

This invention relates to a signal traffic control system by means of which utilization of signal producing equipment such as phonographs, tape recorders, radios, etc. may be increased and enhanced.

It is therefore a primary object of the present invention to provide a signal routing control system associated with a plurality of signal sources and particularly audio signal sources such as phonographs, tape recorders, radios, etc. through which the signal outputs of the sources may be routed in a programmed manner and supplied to a plurality of remote locations at which signal selections may be made without interference between the respective locations.

An additional object of the present invention in accordance with the foregoing object, is to provide a signal routing control system through which varying degrees of control may be exercised over the signals supplied to the remote locations while preserving the selective controls over the signal output devices or speakers located at the respective remote locations.

In accordance with the foregoing objects, the system of the present invention contemplates the selective audio reproduction of both monaural and stereo sources simultaneously and individually at the respective remote locations. The system also contemplates a central overriding control for increasing the signal level at the respective remote locations in connection with the signal supply thereto from certain of the sound sources.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
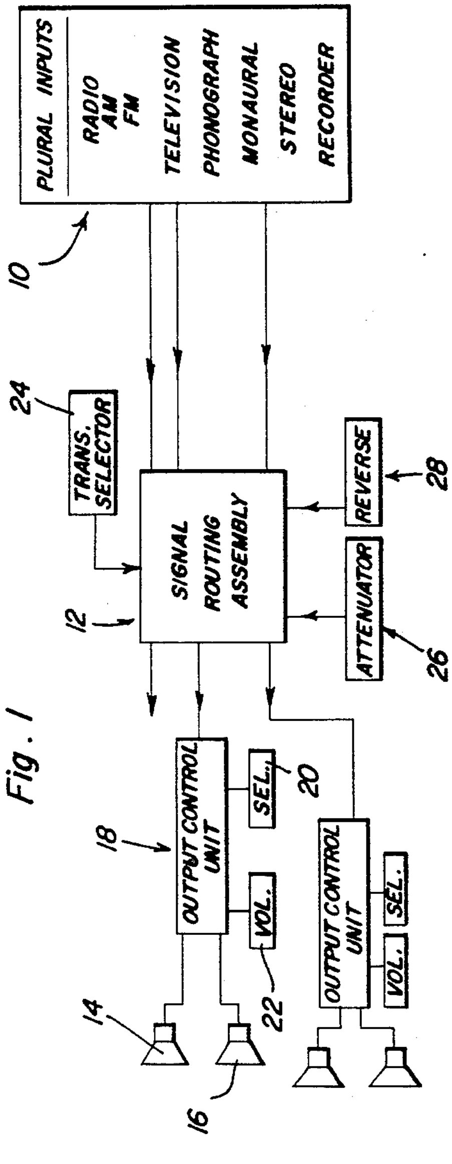
FIGURE 1 is a block diagram illustrating the system of the present invention.

Referring initially to FIGURE 1, it will be observed that the system of the present invention is associated with a plurality of input sound sources generally designated by reference numeral 10. Accordingly, a plurality of signals from the input sources are routed through the signal routing assembly 12 and supplied to a plurality of remote stations. Located at each remote station, are at least two output devices such as the speakers 14 and 16 to which a plurality of signals are supplied under control of the output control unit generally referred to by reference numeral 18. Associated with the control unit 18, are signal selecting facilities 20 by means of which the respective output speakers are rendered operative to receive selected signals. Also associated with the control unit 18 at each of the remote stations, are volume control facilities 22.

In addition to the control over the signals exercised at each of the remote stations, centralized control is also exercised over the signals at the signal routing assembly 12. Accordingly, associated with the signal routing assembly is a transmission selector 24 through which the signal traffic may be controlled. Also associated with the signal routing assembly is an attenuator component 26 through which certain selected signals are varied in level for different purposes. The selected signal sources to which the respective output speakers are connected through the signal routing assembly may also be changed through a signal reversing control 28 at the central control station.

Figure 2:
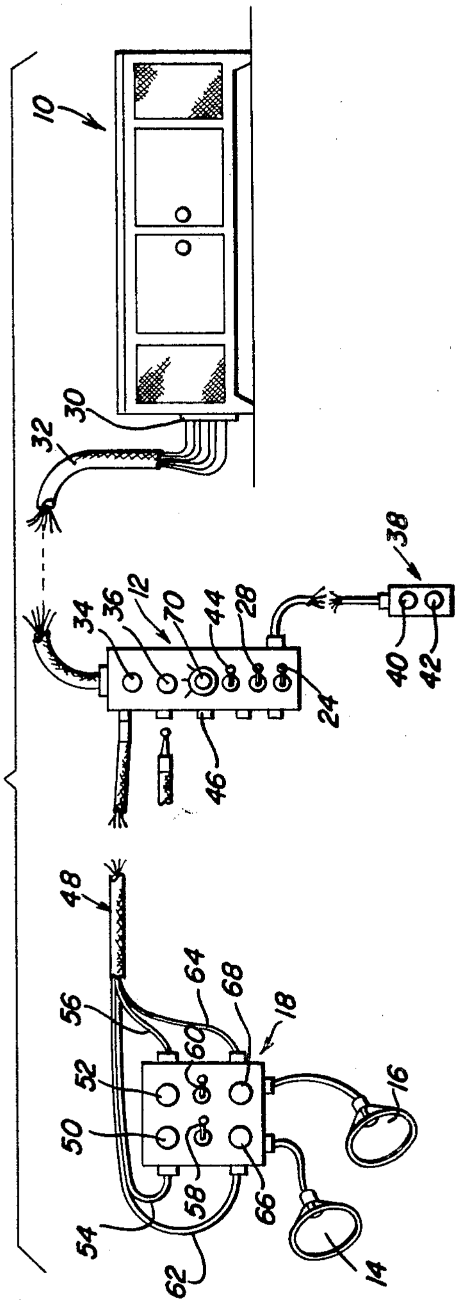
FIGURE 2 is an illustration of a typical installational arrangement for the system of the present invention.

Referring now to FIGURE 2, it will be observed that the plurality of input sources could be derived from a multiple component console which includes for example A.M. and F.M. radio, television, tape recorder, and both monaural and stereo phonograph equipment. Accordingly, a plurality of signal sources will be available which may be connected to the system of the present invention from any suitable terminal assembly 30 to which the signal routing assembly 12 is electrically connected by a multi-conductor conduit 32. It should, of course, be appreciated that the signal routing assembly 12 could be physically incorporated within the console itself. It will also be observed that the signal routing assembly 12 is provided with a pair of attenuator controls 34 and 36 through which the level of selected signals may be regulated. Alternatively, the signal level may be regulated from a location remote from the signal routing assembly 12 by means of a remote attenuator component 38 also having a pair of attenuator controls 40 and 42. The signal routing assembly 12 is therefore provided with an attenuator selector 44 by means of which either the attenuator controls 34 and 36 are rendered operative or the remote attenuator component 38. Also associated with the assembly 12, is the aforementioned reverse control 28 and the transmission selector 24.

It will be observed that the assembly 12 is also provided with a plurality of multi-contact plug-in connectors 46 by means of which signal connections may be made to each of the remote stations such as separate rooms by means of multi-conductor cables 48. It will therefore be observed from FIGURE 2, that each remote location or room has associated therewith the output signal speakers 14 and 16 electrically connected to the control unit 18 to which the cable 48 is connected. The control unit therefore has associated therewith, a pair of volume level controls 50 and 52 for respectively regulating the output volume from the speaker 14 through conductors 54 and 56, the speaker 14 being selectively connected to either the signal lines 54 or 56 through the selector switch 58. Similarly, the speaker 16 is selectively connected through selective switch 60 to either signal line 62 or 64 and the output volume of the speaker regulated either through the volume control 66 or 68 depending upon which of the signal lines it is connected to. It will, of course, be appreciated, that a control unit 18 and a pair of signal output speakers will be suitably installed at each remote station or room. The signal routing assembly 12 will therefore be designed to accommodate any desired number of plug-in cables 48 to which the control units 18 are connected. The assembly 12 is also provided with an input selector switch assembly 70 through which a selection is made from the plurality of signal input sources to be regulated by the attentuator controls, the signals so regulated being in addition to constant level signals routed through the assembly 12 to the respective control units as will be hereafter explained.

Figure 3:
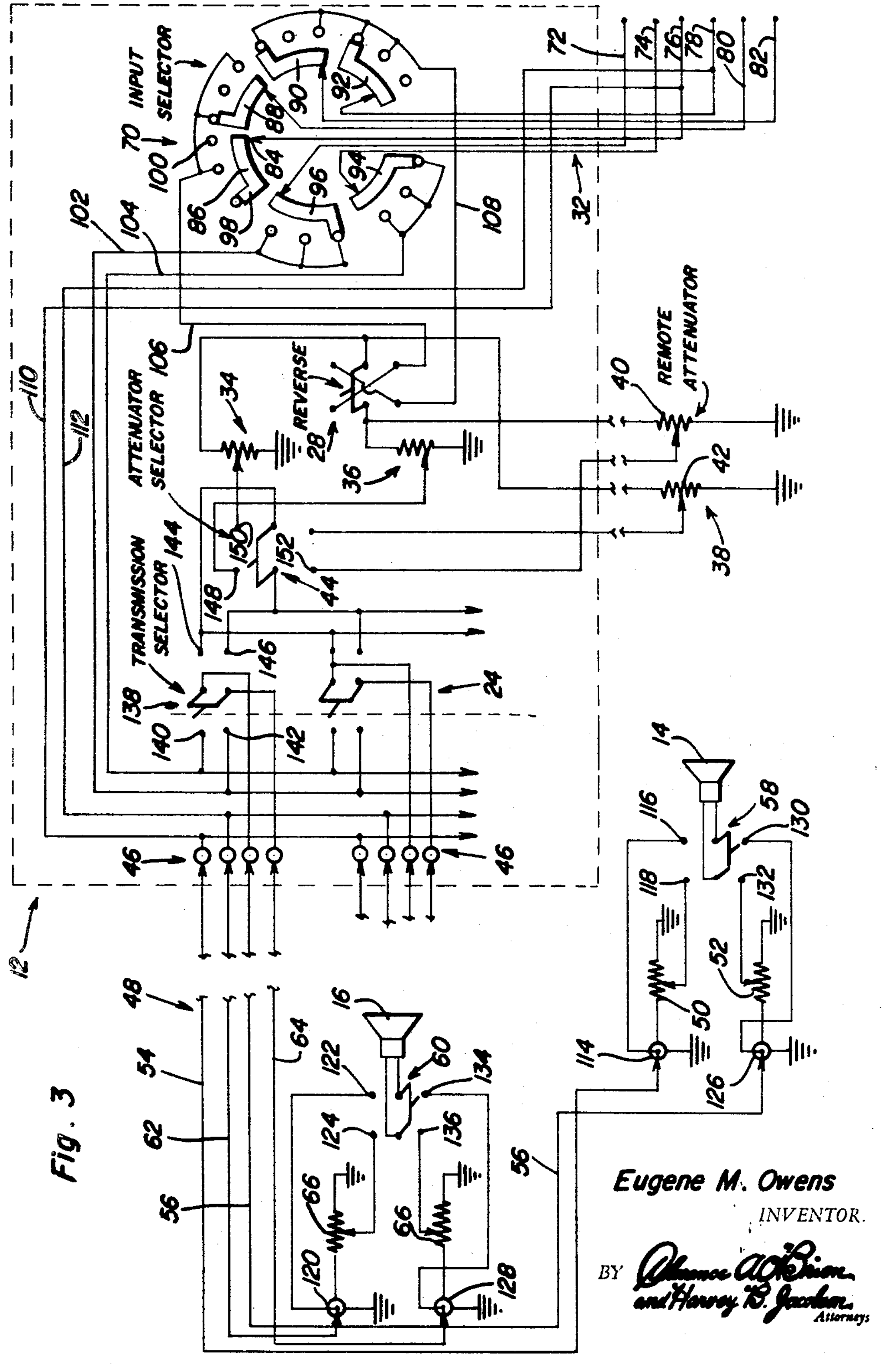
FIGURE 3 is an electrical circuit diagram illustrating one particular embodiment of the system.

Referring now to FIGURE 3 in particular, it will be observed that six input lines 72, 74, 76, 78, 80 and 82 are enclosed within the cable 32 by means of which the input sources are connected to the multi-contact switch assembly 70 in the signal routing assembly 12. Each of the input lines is connected to a stationary wiping contact 84 so that it will be in continuous electrical contact with one of the six contact segments 86, 88, 90, 92, 94 and 96. The six contact segments respectively include a radially projecting portion 98 at one end adaptad to engage one of the radially outer stationary contacts 100 associated with the switch assembly. Three of such radially outer contacts are associated with each of the contact segments so that upon rotation of the switch assembly, all of the contact segments will be simultaneously displaced into contact with one of the three contacts 100 associated therewith through the projecting contact portion 98. Thus, in the position illustrated in FIGURE 3, each of the contact segments is in electrical contact with the first of the three outer contacts associated therewith. All of the contacts 100 associated with the contact segment 96 are electrically interconnected so that in any of the operative positions of the switch assembly, the input signal line 72 will be electrically connected to the conductor 102. Similarly, the input signal line 74 is electrically connected to the conductor 104 through the contact segment 94 for any of the operative positions of the switch assembly. Also in the illustrated position of the switch assembly, the input signal line 80 is electrically connected through the contact segment 88 to the conductor 106 while the input signal line 82 is electrically connected through the contact segment 90 to the conductor 108. However, in the second or intermediate operative position of the switch assembly no electrical connections are established by the contact segments 88 and 90 between the signal lines 80 and 82 and the conductors 106 and 108. Instead, the conductors 106 and 108 are respectively connected by the contact segments 86 and 92 to the signal lines 76 and 78 when the switch assembly is in the second position. No electrical connections are established with the signal lines 76 and 78 through the switch assembly in the illustrated position. However, the input signal lines 76 and 78 are permanently connected through the conductors 110 and 112 to each of the multi-contact connector assemblies 46 in order to establish a direct electrical connection between the input lines 76 and 78 to the control units 18 through the conductors 54 and 62. Accordingly, the input sources connected to the input signal lines 76 and 78 may be set at a constant volume level for direct supply of signals to the output speakers 14 and 16 at each of the remote stations. The signal sources connected to the signal lines 76 and 78 may for example be A.M. and F.M. radios.

The signal transmitting conductor 54 is connected to the control unit 18 through a grounded connector 114 so that the signal transmitted therethrough will be fed to the speaker 14 when the selector switch 58 is displaced into engagement with the contacts 116 and 118. The volume control 50 will then be operative to regulate the output volume of the speaker 14. The signal transmitting line 62, on the other hand, is connected through the grounded connector 120 so that when the selector is displaced into engagement with the contacts 122 and 124, the signal carried by conductor 62 will be fed to the speaker 16. In the foregoing position of the signal selector switch 60, the volume control 66 will be operative to regulate the output of the speaker 16. The signal transmitting conductors 56 and 64 from the multi-contact connector assembly 46 are similarly connected by the grounded connectors 126 and 128 to the speakers 14 and 16, respectively, when the signal selector switches 58 and 60 are displaced to the opposite operative positions. With the signal selector switch 58 engaging contacts 130 and 132, the signal transmitted by conductor 56 will be fed to the speaker 14, and the output volume will then be regulated by the volume control 52. On the other hand, the signal transmitted through conductor 64 will be fed through the connector 128 to the speaker 16 when its signal selector switch 60 engages the contacts 134 and 136 then rendering the volume control 68 operative to regulate the output volume of the speaker 16. It will therefore be apparent, that in one of the operative positions of the signal selector switches 58 and 60, the speakers at any of the remote stations will be connected directly to the input signal lines 76 or 78. Accordingly, the input sources available through the lines 76 or 78 can always be received at any of the remote stations regardless of the programming and selection made at the control station through input selector 70. However, when the signal selector switches 58 and 60 are displaced to the other operative positions, then connections to the input signal sources will be established dependent upon the programming and selection established at the control station.

It will be observed, that each of the multi-contact connector assemblies 46 is associated with one of the ganged switch sections 138 of the transmission selector 24. Accordingly, when the switch sections 138 are displaced into engagement with the contacts 140 and 142, an electrical connection is established between the signal transmitting conductors 56 and 64 with the conductors 104 and 102, respectively. Inasmuch as the conductors 102 and 104 are always electrically connected to the input signal lines 72 and 74 regardless of the position of the switch assembly 70, the sources connected to the input signal lines 72 and 74 will always be available at each of the remote stations through the signal transmitting lines 56 and 64 when the switch sections 138 engage the contacts 140 and 142. When the switch sections of the transmission selector, however, are displaced into the other operative positions engaging the contacts 144 and 146, the signal transmitting lines 56 and 64 are connected to the attenuator controls through which selected signals from the selector switch assembly 70 are routed.

The contacts 144 and 146 in the transmission selector, are respectively connected to the switch element of the attenuator selector 44 in order to establish electrical connections through contacts 148 and 150 with the wiper arms of the attenuator controls 34 and 36, or through the contacts 152 and 154 with the wiper arms associated with the remote attenuator controls 40 and 42. The attenuators 34 and 36 at the central control station are reversibly connected to the conductors 106 and 108 through the reversing switch assembly 28 to which the remote attenuator controls 40 and 42 are also connected so that they may be alternatively connected to the conductors 106 and 108 depending upon the operative position of the attenuator selector 44. As hereinbefore pointed out, the conductors 106 and 108 are either connected to the input signal lines 80 and 82 in the illustrated position of the input selector switch assembly 70 or to the input lines 76 and 78 to which the control units 18 are already permanently connected via the signal transmitting conductors 56 and 64. It will therefore be apparent, that the respective speakers 14 and 16 at each of the remote stations may be connected to different selected sources when the switch assembly 70 is in the illustrated position, the selection being varied by reversing or changing the signal sources to which the respective speakers 14 and 16 are connected by operation of the reversing switch 28 and by displacement of the transmission selector 24 between its two operative positions. With the transmission selector in the operative position engaging the contacts 144 and 146, however, signal level control may be exercised at the control station through the attenuator controls. When the switch assembly 70 is in its intermediate position, attenuated signals from the constant level sources to which the signal lines 76 and 78 are connected, will also be available at the remote locations as a result of which the volume level of the signals may be increased since both speakers may then be conditioned for connection to the same signal source with one of the signal paths being under control of the attenuator at the control station. This feature could be useful in order to emphasize certain audio inputs reproduced at the remote stations.

From the foregoing description, the construction, operation and utility of the system of the present invention will be apparent. It should therefore be appreciated that the system of the present invention will enable increased utilization of a plurality of audio signal sources presently available in homes, buildings, motels, hotels, etc. The system will therefore permit simultaneous transmission of signals from either monaural sources and stereo sources in which case the respective pairs of signal lines described in connection with FIGURE 3 could constitute the two stereo channels. For example, the input signal lines 80 and 82 could constitute the two stereo channels from a stereo phonograph available at each of the remote stations with the switch assembly in the illustrated position and the transmission selector 24 displaced into engagement with the contacts 144 and 146. Also, the speaker to which the respective input signal lines 80 and 82 are connected could be reversed through the reversing switch 28 in order to select a more suitable speaker for the respective channels. It will of course be appreciated, that the speakers could be conditioned through the signal selector switches 58 and 60 to receive the signals available through the signal lines 74 and 76 if desired at any time regardless of the position of the input selector assembly 70 or the transmission selector 24. The transmission selector will of course be operative to either limit control over the signal level to the operator at the remote stations or under joint control of the control units 18 and the signal routing control assembly 12. The signal routing assembly may thereby also provide an overriding signal level control for the constant volume level maintained over the signals transmitted through the input signal lines 76 and 78, if locally desired at any remote station. Accordingly, individual desires at respective remote stations may be accommodated without interference or conflict.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a system for routing signals from a plurality of inputs connected to a control station, a plurality of separate remote stations, each remote station having at least two output devices and a signal selector for each output device displaceable between one operative position connecting the output device to one of said inputs and a second operative position, input selector means at the control station for selecting the inputs from which signals are supplied to each output device through the associated signal selector in the second operative position, attenuating means connected to the input selector means for varying the level of the signals from the inputs selected by the input selector means, and transmission selecting means operatively connecting the signal selector at each of the remote stations to the attenuating means and the input selector means for alternatively connecting each output device to either another of said inputs or to the selected inputs, said input selector means comprising, a multi-contact switch assembly displaceable to at least two signal selecting positions, said switch assembly being operative in one of said signal selecting positions to connect said one of the inputs to the attenuating means to increase the level of the signal supplied therefrom to the output devices, and reversing switch means operatively connecting the multi-contact switch assembly to the trans mission selecting means for changing the output devices at each of the remote stations to which the respective selected inputs are connected.

2. The combination of claim 1 including second attenuating means operatively connected to the signal inputs and located remote from the central control station, and means for alternatively connecting said second attenuating means to the transmission selecting means for regulating the level of the signals supplied to the output devices.

References Cited

UNITED STATES PATENTS

| | | | |
|---|---|---|---|
| 2,778,875 | 1/1957 | Wiles et al. | 179—1 |
| 3,037,567 | 6/1962 | Howman | 179—1.1 |
| 3,217,104 | 11/1965 | Tabet | 179—1.1 |

KATHLEEN H. CLAFFY, *Primary Examiner.*

R. P. TAYLOR, *Assistant Examiner.*